Nov. 17, 1931.  L. W. EGGLESTON  1,832,693
FLOAT VALVE
Filed Dec. 16, 1927
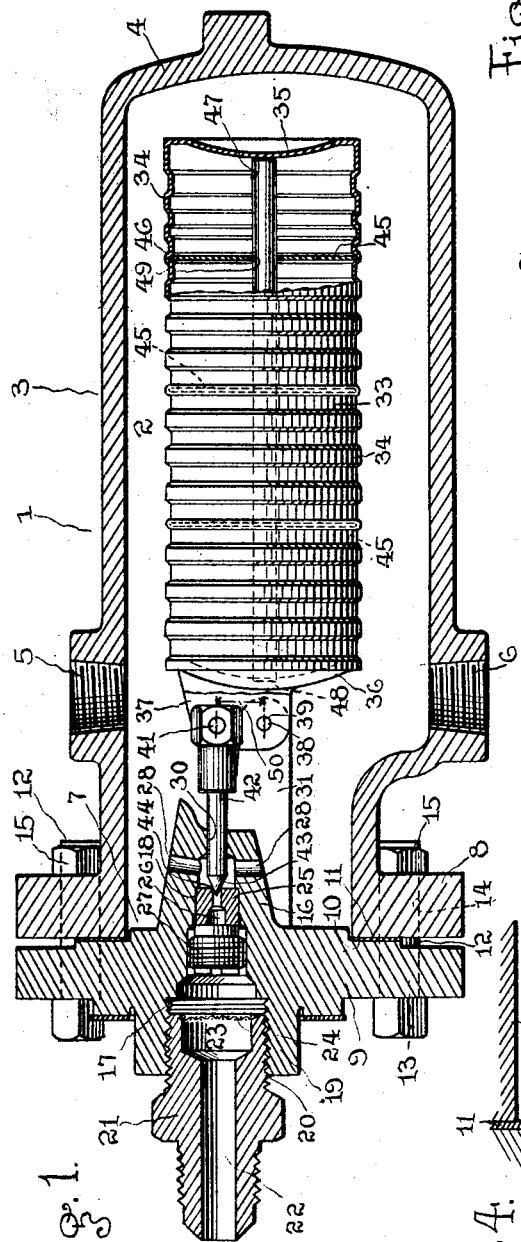
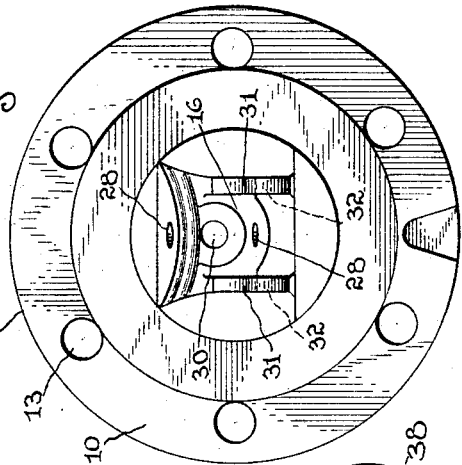
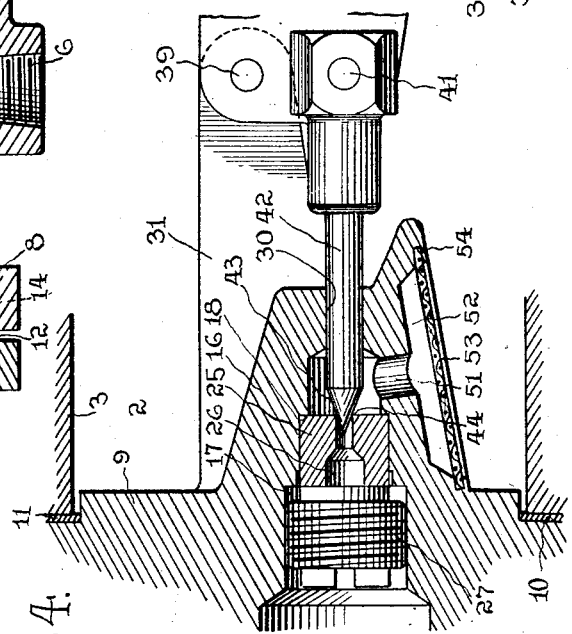
Inventor
Lewis W. Eggleston
By his Attorney Patented Nov. 17, 1931

1,832,693

UNITED STATES PATENT OFFICE

LEWIS W. EGGLESTON, OF DETROIT, MICHIGAN, ASSIGNOR TO AMERICAN RADIATOR COMPANY, OF NEW YORK, N. Y., A CORPORATION OF NEW JERSEY

FLOAT VALVE

Application filed December 16, 1927. Serial No. 240,362.

My invention relates to new and useful improvements in float valves, and more particularly to a float-controlled valve adapted among other uses to be embodied in a refrigerating system to control flow of a refrigerant.

An object of my invention is to provide a float valve which is simple in construction and efficient in operation.

Another object is to provide a float so constructed that it will be sufficiently light in weight for efficient operation, but will have the necessary rigidity to withstand external pressures to which it may be subjected in a refrigerating system without collapsing.

The invention consists in the improved construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, and wherein—

Figure 1 is a longitudinal vertical central section through the float valve;

Fig. 2 is a detail of the float head;

Fig. 3 is a detail of the valve seat plate, and

Fig. 4 is a detail in longitudinal vertical section similar to Fig. 1, showing a modification of the device.

Referring to the drawings by characters of reference, 1 designates a hollow body or casing, preferably of cast metal and having an internal chamber 2 and a surrounding side wall 3, which is preferably cylindrical. Through the wall 3 are oppositely disposed ports 5, 6, which are internally threaded. One end of chamber 2 is closed by an end wall 4, which is preferably formed integral with the casing 1. The other end of the chamber 2 is open, as at 7, and flush with this open end of wall 3 and extending laterally therefrom around the casing 1, is an annular external flange 8.

The open end 7 of casing 1 is closed by a closure head, preferably in the form of a rigid plate 9 having an annular seat 10 on its inner face adapted to cooperate with the face of flange 8. Between the abutting faces of seat 10 and flange 8, I preferably insert an annular gasket 11, of any suitable material which will tightly seal the joint. The plate 9 and casing 1 may be secured together by clamping bolts 12 passed through holes 13 in plate 9 and alined holes 14 in flange 8 and having nuts 15 for drawing up on the bolts to tightly clamp the plate to said flange.

On the closure head or plate 9 is a boss 16, preferably of substantially conical form which projects from the inner face of plate 9 into the chamber 2. Extending through the plate 9 and into the boss 16 is a passage 17 which is decreased in diameter within the boss 16 to form an outwardly facing shoulder seat 18. In line with boss 16 but on the outer face of plate 9, is a hollow nipple 19, preferably integral with plate 9 and forming a continuation of passage 17 and having internal threads 20. Threaded into the nipple 19 is a hollow plug 21 having a longitudinal bore 22 which is adapted to be connected to a conduit for a purpose to be described. The inner end of bore 22 is enlarged, as at 23, and across the end thereof is secured, in any suitable manner, a filtering element 24, preferably a screen of wire mesh. Fitted within passage 17 is an annular valve seat member 25 which abuts the shoulder seat 18 and has a port 26 therethrough. The member 25 is secured in passage 17 and in engagement with shoulder seat 18 by an externally threaded sleeve 27 which is threaded into engagement with the wall of the passage 17 and against member 25. Through the boss 16 are one or more passages 28 which lead from the inner end of passage 17 beyond member 25 to the chamber 2. Concentric with the valve port 26 is a guideway 30 through the end of boss 16 from passage 17 to chamber 2. Carried by the plate 9 and rigid therewith are spaced, substantially parallel, vertical supports 31 positioned on opposite sides of the boss 16 and extending into the chamber 2 a greater distance than boss 16. Through the spaced supports 31 in a plane spaced from and substantially parallel to a horizontal plane through passage 17, are oppositely disposed pivot pin openings 32 (see Fig. 3), for a purpose to be described.

In the chamber 2 is a hollow metal float 33, which is preferably cylindrical and formed from copper tubing having a metal thickness of substantially .008 inches, though the float may be made of other material. In making the float with such thin walls, I obtain a float which is of light weight and very buoyant. However, the float is subjected to high external pressures which might collapse it, and I therefore support the walls and heads internally to render the float rigid, as will be described. The end of the float 33 adjacent the end 4 of chamber 2 is closed by an end wall 35, which is preferably formed integral with the side wall and is also concave for rigidity. The opposite end of the cylindrical float is closed and sealed by a rigid plate 36 which is sealed to the side wall at its periphery, as by solder. From the external face of plate 36 project spaced substantially parallel vertical supporting arms 37, so spaced that they will lie between the supports 31 with each of the arms 37 substantially in contact with an inner face of the respective supports 31 to maintain the float laterally in position. Through each arm 37 is a pivot pin opening 38 which is substantially in a horizontal plane through the center line of the float and which openings are alined with the pivot pin openings 32 in supports 31. Through these alined holes 32, 38 is passed a pivot pin 39, about or on which the float may oscillate in a vertical plane. Also through arms 37 are oppositely disposed openings 40 which are spaced from openings 38 such that when the center line of the float is horizontal the holes 40 will lie substantially in a horizontal plane through the longitudinal center line of passage 17. Secured in these openings 40 is a pivot pin 41, on which is journalled, between the arms 37, one end of a valve stem 42 which projects through the guide opening 30 in boss 16. On the free end of stem 42 within the passage 17 is a valve 43, preferably of the needle type which cooperates with a valve seat 44 on member 25 to close port 26 and passage 17. When the centerline of the float is substantially horizontal, the valve 43 is held tightly to its seat 44.

The side wall of the float 33 is preferably corrugated circumferentially for strength, and spaced longitudinally within the float are transverse supporting members 45, preferably in the form of discs of sheet aluminum. Each member 45 is tightly secured, as by spinning, along its periphery in a circumferential fold of the side wall of the float, as at 46, and serves in conjunction with the circumferential corrugations 34 to support the float against lateral collapse. Also within the float, and coaxial therewith, is a rigid bar member 47, preferably in the form of a tube which may be of aluminum or other light metal and which is seated at one end in a socket 48 in the end plate 36, and extends therefrom through axial apertures 49 in the partition supports 45 into abutment with the concave end wall 35 to which it may be secured in any suitable manner, if desired. This hollow tube 47 braces the float 33 internally against longitudinal collapse.

The operation of the float valve is as follows: The float valve having been connected in a system, such, for example, as a refrigeration system, with either the port 5 or the port 6 closed and sealed by a closure plug (not shown), and with a pipe or conduit from a liquid pressure source connected to the bore 22 of the plug 21 and an outlet pipe connected to the unplugged port 5 or 6, the valve is ready for operation. Liquid admitted from the source through bore 22 of plug 21 will be filtered by the screen 24 and then pass through valve port 26 and passages 28 into chamber 2, since the weight of the float 33 when the chamber 2 is empty normally holds the valve 43 from its seat 44. As the level of the liquid admitted to chamber 2 rises, it will raise the float 33 on its fulcrum or pivot 39 until the centerline of the float is substantially in a horizontal plane through pivot pin 39, and during this movement of the float it will act through its lever arm 50 between the pivot pins 39 and 41 to slide valve stem 42 through its guideway 30 to move valve 43 to its seat 44, thus tightly closing orifice or port 26. When the level of the liquid drops in chamber 2, by passage through the unplugged port 5 or 6, the float will drop, turning on its fulcrum 39 and operating through its lever arm 50 to pull the valve 43 from its seat 44 to open port 26 to admit more liquid to chamber 2 from the source until the float again raises to force the valve to its seat.

The modification shown in Fig. 4 is substantially the same as the form above described. The float valve of Fig. 1 is here inverted so that port 5 will be lowermost and the float 33 when the chamber 2 is empty of liquid will drop or turn on pivot 39 to a substantially horizontal position to normally hold the valve 43 on its seat 44. The only structural changes from the device above described are the elimination of all but one of the passages 28 of Fig. 1, leaving a single passage 51, Fig. 4, which opens downward from passage 17 into a recess 52 formed in boss 16, the recess opening into chamber 2. The recess 52 has a filter element 53, preferably a screen of fine wire mesh, secured along its marginal edge, as at 54, to the side edges of the recess 52 to prevent dirt or foreign matter from clogging the valve.

The operation of this modification, shown in Fig. 4, is as follows: The inlet of refrigerant from the source is directly into the chamber 2 through either the port 5 or the port 6 (not shown), whichever it is desired to use, the other being tightly plugged as done in Fig. 1, and the outlet is through the filter screen 53 to passages 51 and 17. In this form the valve is normally closed so that if a gas enters chamber 2 and not a liquid, the valve will not function to permit the gas to flow from the chamber 2, but will only open when sufficient liquid has entered the chamber to raise the float or open the valve. Since the float will not rise sufficiently to open the valve until the liquid level is above the entrance to passage 51, gas which may have entered the chamber 2 will be prevented, when the float opens the valve, from flowing out into passage 17 and to the refrigerating element or low side of the system, due to the liquid seal at passage 51. If the level of the liquid in chamber 2 drops, due to discharge of liquid via passage 17, or otherwise, so that liquid does not seal the passage 51, then the float 33 will have dropped or turned on its pivot 39 with the drop of liquid to close the port 26 to prevent the egress of gas from chamber 2.

What I claim and desire to secure by Letters Patent of the United States is:—

1. A float valve of the character described, comprising a substantially flat plate having a boss projecting from a face thereof, a support projecting from the face of said plate and extending beyond said boss, a passage through said plate having its inner end terminating in said boss, a lateral passage opening through said boss into said first passage, a valve seat in said first passage, a guide opening through said boss in the axial line of said seat, a valve stem slidably mounted in said guide opening, a valve carried by said stem for cooperation with said seat to close said passage, an elongated float, a plate closing one end of said float and having an arm, means pivotally connecting said arm and said support, and means pivotally connecting said arm and said valve stem.

2. A float of the character described comprising an elongated hollow body having circumferential corrugations and means within said body to prevent longitudinal collapse thereof.

3. A float of the character described comprising an elongated hollow body having circumferential corrugations, means within said body to prevent longitudinal collapse thereof, and means within said body to prevent lateral collapse thereof.

4. A float of the character described comprising an elongated body having circumferential corrugations and rigid end closure walls, a supporting disc within said body and laterally bracing the same, said disc being fixed at its marginal edge to the side wall of the body, and a longitudinally supporting member within said body abutting said end walls and passing through said disc.

5. A float of the character described comprising an elongated body having circumferential corrugations and end closure walls, spaced discs in said body and the edges of which are held by said corrugations, a longitudinal member passing through said discs and engaging said end walls to prevent longitudinal collapse of the body.

6. A float of the character described comprising an elongated body having circumferential corrugations and end closure walls, one of which walls is provided with a seat, spaced discs in said body, and the margins of which are held by said corrugations, and a longitudinal bar passing through said discs and cooperating with the end walls to prevent longitudinal collapse of the body, one end of said bar engaging said seat.

7. A float of the character described comprising an elongated hollow body of thin gauge metal, and having circumferential corrugations, end walls closing the ends of said body, spaced disc members in said body and engaging the side wall thereof to prevent lateral collapse of the body, and a rigid bar within said body and passing through said discs, the ends of said bar cooperating with the end walls to prevent longitudinal collapse of the body.

In testimony whereof I have hereunto signed my name.

LEWIS W. EGGLESTON.